US008903897B2

(12) United States Patent
Relan et al.

(10) Patent No.: US 8,903,897 B2
(45) Date of Patent: Dec. 2, 2014

(54) SYSTEM AND METHOD FOR PROVIDING INTERACTIVE CONTENT TO NON-NATIVE APPLICATION ENVIRONMENTS

(75) Inventors: Rohan Relan, Atherton, CA (US); Rajat Gupta, Los Altos, CA (US); Chaitanya Ramavajjala, Seattle, WA (US); Chuo-Ling Chang, Mountain View, CA (US); Ping-Hao Wu, San Francisco, CA (US); Peter Tan, Campbell, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 13/543,720

(22) Filed: Jul. 6, 2012

(65) Prior Publication Data
US 2013/0013671 A1    Jan. 10, 2013

Related U.S. Application Data

(60) Provisional application No. 61/506,022, filed on Jul. 8, 2011.

(51) Int. Cl.
G06F 15/16       (2006.01)
H04L 29/06       (2006.01)
G06F 9/44        (2006.01)
G06F 17/30       (2006.01)
H04L 29/08       (2006.01)

(52) U.S. Cl.
CPC .......... *G06F 9/4445* (2013.01); *H04L 65/1059* (2013.01); *G06F 17/30899* (2013.01); *H04L 65/4084* (2013.01); *H04L 67/34* (2013.01)
USPC ....................................... 709/203

(58) Field of Classification Search
CPC ........................ H04L 65/4084; H04L 67/34
USPC ........................................... 709/203
See application file for complete search history.

(56) References Cited

U.S. PATENT DOCUMENTS

| 7,849,491 | B2   | 12/2010 | Perlman |
| 7,916,147 | B2   | 3/2011  | Clemie et al. |
| 8,259,816 | B2 * | 9/2012  | Coleman, Sr. ............ 375/240.26 |
| 2002/0026495 | A1 * | 2/2002  | Arteaga ........................ 709/217 |
| 2006/0281556 | A1 * | 12/2006 | Solomon et al. ................ 463/43 |

OTHER PUBLICATIONS

Richardson, *The RFB Protocol*, RealVNC Ltd., Version 3.8, Last updated Nov. 26, 2010, 43 pgs.
Gaudiosi, *Gaikai CEO David Perry Sees the Future of Gaming in the Cloud*, Forbes, TECH, Jun. 29, 2012 @ 12:16 PM, 2213 Views, 6 pgs.
*Remote Desktop Protocol*, Windows, Dev Center—Desktop, Printout dated Jul. 6, 2012 obtained from http://msdn.microsoft.com/en-us/library/windows/desktop/aa383015(d=printer,v=vs.85).aspx, 3 pgs.

* cited by examiner

*Primary Examiner* — Yves Dalencourt

(57) ABSTRACT

An automated electronic application delivery system for delivery software applications to client devices for which they were not originally intended for or developed. The applications are run on the particular application environment at the server side, and the content output by the application is capture, encoded, and streamed to the client devices in a way that minimizes latency. User interacts with the content and such interaction data is either mapped to a specific command catered to the application either at the client side or the server side. The mapped command or raw interaction data is then provided to the application over a control channel.

18 Claims, 5 Drawing Sheets

SYSTEM AND METHOD FOR PROVIDING INTERACTIVE CONTENT TO NON-NATIVE APPLICATION ENVIRONMENTS

CROSS-REFERENCE TO RELATED APPLICATIONS

This application claims the benefit of U.S. Provisional Application No. 61/506,022, filed on Jul. 8, 2011, the content of which is incorporated herein by reference.

FIELD OF THE INVENTION

The present invention relates generally to providing content from applications originally built for one native application environment, to a different, non-native application environment, and more particularly, to a system and method that delivers such content over a data communications network so as to achieve a highly interactive and responsive user-experience.

BACKGROUND

Computer applications are generally built to run on a particular computing platform or application environment. For example applications built for a PC are often built to run in and on a Microsoft Windows application environment. Applications that are built using Flash's Actionscript are built to run in a Flash application environment. Mobile applications for Android phones are built to run in an Android OS platform, whereas mobile applications built for Apple's iPhone are built to run in Apple's iOS platform.

As new and different platforms arise, such as in mobile computing, a problem that application developers often face is the lack of ability to deliver existing application assets to the new platforms without extensive application redevelopment. This is especially but not exclusively true for developers that have traditionally developed applications for non-mobile devices. As the user base quickly moves to consuming content on the Internet with mobile devices, there is an increased need to make existing applications built for non-mobile devices, be available on mobile devices.

The problem is also true for developers of mobile applications. Because mobile applications are also often written for specific platforms, it is generally not possible to deliver applications built for one specific mobile platform, such as, for example, the Android platform, to another mobile platform, such as, for example, Apple's iOS platform.

Although applications can be redeveloped for new and popular computing environments, this may be problematic for various reasons. For example, the developer may not have the money, skills, or knowledge required to redevelop their applications in a new computing environment. Also, the developer may not have the specific technical programming skills and knowledge required to develop applications on the new platform. It may also not be easy to determine which of various competing environments would be most successful in order to select such an environment to redevelop an existing application. The time-to-market delay for the application developer to redevelop the application may affect the company's competitiveness and market share, deterring the developer from redeveloping the application.

One common solution to the problem of hosting applications written for one platform on a different platform is emulation software. Emulation software provides a simulated environment of the original environment on the new platform. However providing emulation software for mobile platforms is problematic for several reasons. In some cases, the original environment to be emulated may be too complex to be implemented within the technical constraints of the mobile platform. Even if the original environment could be emulated on the mobile device, constraints in terms of memory or processing speed or external storage, may not allow the application to run properly or at all on the mobile devices. Other business impediments imposed by the developer of the mobile device environment may also prohibit emulation.

Thus, there is a need for a system and method that allows application developers to leverage existing application assets to reach a wider audience than what was originally intended, that is, audience on new computing devices, platforms, and/or application environments, and to do so without incurring the time delays and cost associated with redeveloping applications for the new devices and platforms.

SUMMARY OF THE INVENTION

Embodiments of the present invention are directed to a system and method for delivering interactive content to client devices. The system includes a plurality of host devices, a client device, and a server coupled to the plurality of host devices and the client device over a data communications network. Each host device hosts a software application configured to run on an application environment provided by the host device. The client device is configured to receive interactive content generated by a particular software application configured to run on an application environment different than an application environment provided by the client device.

According to one embodiment, the server is configured to receive from the client device identification of the particular software application. The server identifies one of the plurality of host devices hosting the particular software application and invokes the particular software application on the application environment provided by the identified host device. The server periodically captures and encodes a screen display output generated by the particular software application into a plurality of video frames. The server further streams the plurality of video frames over the data communications network during a streaming session. The server receives interaction data from the client device in response to the streamed video frames and converts the interaction data to a corresponding input catered to the particular software application. The server provides the input to the particular software application, and the software application is configured to generate a second screen output in response.

According to one embodiment of the invention, the server is configured to identify a configuration file associated with the particular software application, and transmit the configuration file to the client device. The client device is configured to map a user input to a particular command based on the configuration file. The server receives the particular command from the client device as the interaction data.

According to one embodiment of the invention, the client device is a mobile phone, electronic tablet, or set top TV box. The software application may be a Flash-based application, Windows application, Java-based application, or Linux application.

According to one embodiment of the invention, the second screen is output in real-time with the providing of the interaction data by a user of the client device.

According to one embodiment of the invention, the server is configured to monitor condition of the data communications network during the streaming session, and dynamically adjust a visual quality of one or more of the plurality of video frames during the streaming session. For example, the frame rate, video bit rate, and/or maximum frame size of a video frame may be adjusted dynamically during the streaming session. According to one embodiment, the maximum frame size is calculated based on a dynamically determined frame rate and video bit rate.

According to one embodiment of the invention, the monitoring of the condition of the data communications network includes monitoring congestion of the network.

According to one embodiment of the invention, the application environment provided by the host device provides an application programming interface not available to the application environment provided by the client device.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

Embodiments of the present invention provide a system and method for delivering interactive content generated by software applications configured to run on a native application environment, to clients providing non-native application environments, over a data communications network. Such applications may be, for example, gaming applications, and the clients may be mobile phones. The non-native application environments provided by the client devices do not provide the same APIs for running software applications that are provided by the native application environments in which the software applications are intended to run. Although embodiments of the present invention are directed to providing the interactive content to non-native application environments over the data communications network, a person of skill in the art should recognize that the interactive content may also be provided to native platforms.

In general terms, when the client is a mobile device, the method for delivering the interactive content includes:

1. Selecting on the mobile device a server-resident application to be presented on the mobile device.
2. Customization of how the application will appear on the mobile device.
3. Initialization of control, video and audio channels to be used to deliver application content to the mobile device.
4. Selection of a server to run the application.
5. Startup of the application on the selected server.
6. Server-side screen capture and audio capture of the output of the selected application.
7. Server-side encoding and streaming of the captured video and audio to the client device during a streaming session.
8. Client-side decoding and display of the streamed video on the mobile device.
9. Client-side decoding and playing of the streamed audio on the client device.
10. Client-side input acceptance and encoding on the client device.
11. Client-side forwarding of input to the server-side non-native application.
12. Converting the input to a corresponding input catered to the particular application.
13. Continuous monitoring of the condition of the data communications network during the streaming session and dynamically adjusting the video streams for achieving a highly responsive and interactive experience for the user of the non-native application on the mobile device.

Figure 1:
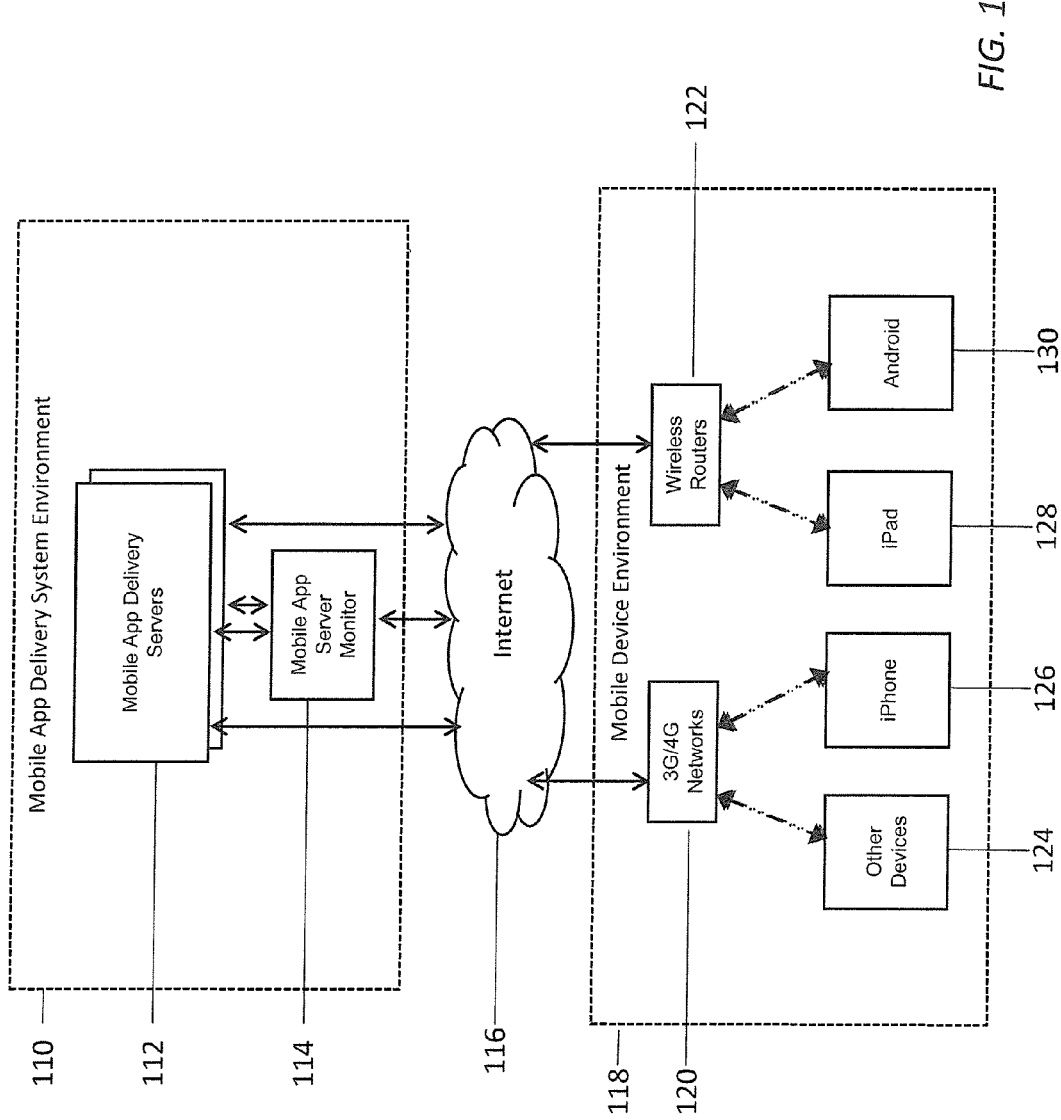
FIG. 1 is an overview block diagram of a system to deliver applications to non-native client platforms according to one embodiment of the present invention.

FIG. 1 is an overview block diagram of a system for efficiently delivering interactive content to non-native client devices and platforms according to one embodiment of the present invention. The system in FIG. 1 includes a mobile application delivery system environment 110, a mobile device environment 118, and a data communications network 116 interconnecting the two environments. The data communications network 116 may be a local area network, private wide area network, or the public Internet, accessible via any wired or wireless technology conventional in the art. In one embodiment of the invention, the mobile application delivery system environment 110 is a cloud computing web server environment.

According to one embodiment of the invention, the mobile application delivery system environment 110 includes a set of delivery servers (also referred to as host devices) 112 and a monitoring server 114. According to one embodiment, each of the delivery servers host a software application on a native application environment. The native application environment provides, at a minimum, the same APIs as the APIs available on the original application environment for which the software application was specifically developed to run.

The monitoring server 114 takes requests to start a new application and selects a specific server from a pool of delivery servers 112 that host the application. According to one embodiment, the delivery servers 112 and/or monitoring server 114 are deployed and run in different geographic locations spread out from one another. In order to give the users a highly responsive interactive experience, the software components that reside in the client devices 124 send ICMP echo requests to a load balancer in a monitoring server 114 in a different geographic location, measure the roundtrip time, and choose the delivery server with lowest latency.

According to one embodiment of the invention, the mobile device environment 118 includes standard carrier 3G/4G networks 120, wireless routers 122, and various client devices 124-130 (collectively referenced as 124). The client devices may be mobile phones, electronic tablets, laptops, TV set top boxes, and the like. Although the environment 118 is described as a mobile environment, a person of skill in the art should recognize that the environment may include other environments, as such, for example, wired environments that include wired devices.

Each of the delivery servers 112, monitoring server 114, and client devices 124 includes a central processing unit (CPU) for executing software instructions and interacting with other system components for performing the functions described herein. The servers and client devices further include a mass storage device such as, for example, a hard disk drive or drive array, for storing various applications and data used for implementing the system. The server and client devices further include an addressable memory for storing software instructions to be executed by the CPU.

The server and client devices further include various input and output units conventional in the art. For example, each device may have an input unit such as, for example, a keyboard, keypad, joystick, microphone, and/or display screens with pressure sensitive (touch screen) technology. Each device may also have an output unit such as, for example, speakers, display screens, and the like. The server and client devices may further include wired or wireless data communication links for accessing the data communications network 116.

Figure 2:
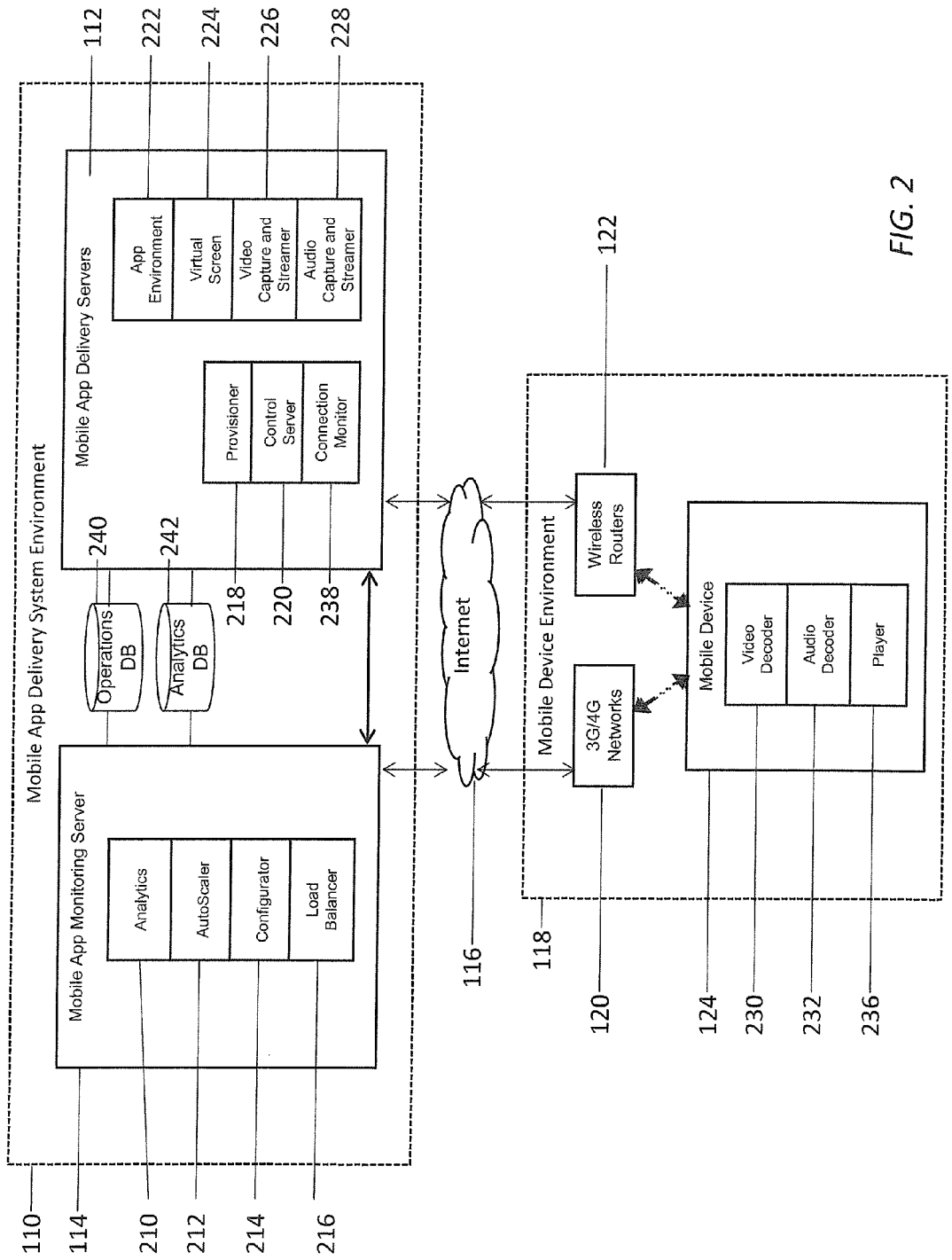
FIG. 2 is a more detailed block diagram of various modules hosted by various computing device of FIG. 1 according to one embodiment of the present invention.

FIG. 2 is an overview block diagram of various modules hosted by the monitoring servers 114, delivery servers 112, and mobile devices 124 according to one embodiment of the present invention. The various modules are implemented via computer program instructions which are stored in memory for executing by the CPU of the corresponding server. A person of skill in the art should recognize, however, that all or a portion of the various modules may be implemented via firmware, hardware, or a combination of software, firmware, and/or hardware.

According to one embodiment of the invention, the modules that reside in the monitoring servers 114 include, but are not limited to, a load balancer 216, a configurator 214 module, an autoscaler 212 module, and an analytics 210 module.

The load balancer 216 is configured to find a delivery server 112 that can support an incoming connection request to start an application. The load balancer is configured to select a machine and process instance for each new application request. Once the load balancer selects a machine instance, it also selects the instance of a control server, provisioner, and application environment modules that will be used for a particular instance of the application.

The load balancer 216 is configured to maximize the number of users on each delivery server 112. This allows more delivery servers 112 to become idle, i.e. without any active connections, so the autoscaler 212 can shut them down, potentially saving on cost.

According to one embodiment of the invention the load balancer 216 uses a connection monitor 238 on each delivery server 112 to find an available server. The connection monitor 238 may be implemented as a Ruby process that polls every second for a number of active connections on its delivery server 112. This includes polling for the number of active application environment processes, such as Firefox processes, Wine processes, or custom processes. The connection monitor 238 sends the collected data to an operations database 240. In one embodiment of the present invention, the operations database 240 is high performance database such as, for example, a Mongodb database, configured to handle a high amount of inserts/updates per second as well as quickly respond to queries. According to one embodiment, the connection monitor 238 sends its hostname, the number of open connections, and the number of available connections (the maximum available connections minus the open connections on a machine).

When a request comes in to the load balancer 216, it queries the operations database 240 to find a delivery server 112 that has connections available. Since there is a lag between when a client has been allocated to a particular delivery server 112, and when the client connects and the connections monitor 238 records the connection, the load balancer 216 cannot entirely trust the data coming from the operations database 240. For example, if a delivery server 112 is near capacity but has one connection available, and the load balancer 216 receives several requests in a short time frame, it may forward all requests to the same delivery server 112 before any client connects and increases the connection count.

In one embodiment of the invention, to mitigate the risk of this happening, two strategies are implemented. First, the load balancer 216 is configured to randomly select from a pool of candidate delivery servers 112 so requests do not always go to the same delivery server 112. Second, the load balancer 216 is configured to keep track of the last time it sent a request to a particular delivery server 112 so as to not send the same server multiple requests in a short time period. If there are no delivery servers 112 with available connections, the load balancer 216 is configured to try a preset number of times (e.g. three times) to find one before simply allocating the connection to a random server. This helps ensure that every user always receives a connection, even though his or her experience may be slightly degraded by the excess load on the server.

In one embodiment of the present invention, the load balancer 216 is further configured to automatically remove problematic delivery servers 112 by checking the responses from the servers. If the response is an error, the server is queued for deletion. Similarly, if the response takes longer than a threshold time period or the delivery server 112 is unreachable, it is queued for deletion.

According to one embodiment of the invention, the autoscaler 212 is a module configured to manage the delivery servers 112 in order to accomplish various tasks. For example, the autoscaler may be configured to make sure enough delivery servers 112 are available to serve current users as well as users that may be connecting in the near future. The autoscaler may also be configured to delete unneeded delivery servers 112 so that there is not excess capacity, thus potentially reducing costs, such as, for example, in an embodiment that uses cloud servers.

In this regard, the autoscaler 212 regularly polls the operations database 240 and checks the number of available connections. If the number of available connections is too low, the autoscaler 212 starts enough delivery servers 112 to a configuration specified target number. If the number of available connections is too high, the autoscaler 212 queues the oldest delivery servers 112 for deletion until the number of available connections is equal to the required buffer size. Queuing the oldest servers for deletion helps reduce the number of errors in the system, as typically the oldest servers are prone to errors. A delivery server 112 that is queued for deletion is not immediately deleted as it may have users currently active. However, a server queued for deletion does not receive new connections. The autoscaler 212 regularly checks if any deleted delivery servers 112 are idle and deletes them when they are.

In one embodiment of the invention the autoscaler 212 is implemented as a set of Ruby processes. The autoscaler 212 may also interact with the cloud providers, such as Blue Box Group and Amazon Web Services, for creating and deleting servers.

According to one embodiment of the invention, the analytics module 210 keeps statistics on system operations. Analytic data is stored in the analytics database 242. The analytics database 242 may be implemented as a high performance database such as, for example, a Mongodb database. The load balancer 216 stores information about user requests in the analytics database 242. The control server 220 updates records in the analytics database 242 when a user of a client device logs out so that total session time can be calculated. The analytics module 210 is designed to take analytic data offline for further processing. In addition, statistics pertaining to application requests and session distribution are available to be queried from the monitoring server 114.

According to one embodiment of the invention, the configurator 214 is a module configured to select and return a configuration file when a user selects a software application or game (collectively referred to as an application) on the client. The configuration files allow customization on the client on a per application basis for elements like mapping user gestures or taps to the original inputs of the application (e.g. mouse down, mouse click events, and the like). The configuration file also supports customization of "player skins" in order to customize the look and feel of the display on the client device.

According to one embodiment, configuration files store information on how the player 236 on the client device 124 should interact with the system, request video frame rate parameters, load content, and the like. There are two types of configuration files: player configuration files and application or game specific configuration files. The player 236 on the client device 124 consumes player configuration files. These files primarily have the URLs of services for retrieval by the player 236. For example a list of apps/games to show on the player 236; user ratings of apps/games, update purchase state in the case of a purchase or trial expiration, and the like. Some parameters may be used to distinguish between different client devices, such as, for example, between an electronic tablet and a mobile phone.

Application or game specific configuration files are used when a particular application or game is being started. This configuration file has all application or game specific information, like the URL to load, the product ID for payment, the screen dimensions it will run at, and parameters to distinguish between the various client devices (e.g. between iPad and an iPhone).

In one embodiment of the invention, configuration files are stored as JSON files. The configuration files allow the player 236 to be as general as possible, and thus allows changes to content or behavior on the fly via changes of the configuration files from the delivery server 112

According to one embodiment of the invention, the provisioner 218 is a module on the delivery servers 112 which sets up a user's account on a particular delivery server. In one embodiment of the present invention, each unique user and its corresponding connection runs in its own Linux user account on the delivery server 112. This allows the sandboxing of users from each other. It also allows the creation of a secure system, as the user accounts have stripped permissions and are only allowed access to files and processes that are required for the selected application. The provisioner 218 creates the user account and adds the user to the required group.

In one embodiment of the present invention, the user account set up by the provisioner 218 is determined based on the requested application. The skeleton directory has the files required for the particular application that is selected, for example the correct Mozilla file for a Flash application or the correct executable for a Wine application. The provisioner 218 also creates files in the user's directory to set parameters for the user. Such parameters may include, for example, the audio port to be used, Facebook credentials needed, and the like. The provisioner 218 is configured to set up some of the services the user may require. For instance, in one embodiment of the present invention, the provisioner 218 creates a puleaudio sink for the user needed to stream audio to the client device.

According to one embodiment of the invention, the application environment 222 is a computer environment in which an application executes. The application environment 222 is specific to the type of application selected by the client device, and a computing platform (or virtualized computing platform based on a different underlying platform) of the delivery servers 112. According to one embodiment, an application environment includes, but is not limited to frameworks, libraries, APIs, and services for the runtime execution of programs developed for a particular computing platform. The application environment may also provide a virtualization layer to provide a different or isolated computing platform. For example, when the particular operating system provided by the computing platform of the delivery servers 112 is Linux, and the selected application is a browser-based application or a Flash-based application, the application environment 222 may be a Firefox browser or other similar browser configured to execute the Flash-based application. If the selected application is a Microsoft Windows application, the application environment 222 is Wine or other similar environment which allows computer programs written for Microsoft Windows to run on Unix-like operating systems. If the selected application requires a graphics processing unit (GPU), such as, for example, for high quality Windows games, the application environment 222 is vglrun. Vglrun executes the application with VirtualGL, which provides OpenGL to Xvnc. When native Unix or Java applications are selected, they are simply run as native applications and the application environment 222 is Unix or Linux.

When the application environment 222 is the Firefox browser, certain Firefox extensions are also used to provide additional functionality and interactivity for a user. For example, a Greasemonkey extension and scripts, and a custom extension, are configured to be used to achieve actions like scrolling, toggling the visibility of the keyboard, URL logging, and the like. The Greasemonkey extension is used to add or edit an HTML DOM that is loaded. The extension associates a script, written in JavaScript, to a URL, and the extension is triggered only for the associated URL. The URLs are filtered through regular expressions. The Greasemonkey scripts trigger after the associated HTML page has been loaded, which serves as an indication that the desired content is loaded, and signals the control server 220 to send a message to the client device 124 to remove the loading screen. The Greasemonkey scripts also attach event handlers to input elements on the HTML page that instruct the control server 220 to show or hide the keyboard. The Greasemonkey scripts are also used to weed out unwanted elements like advertisements and therefore only have the desired content appear on a virtual screen 224 for being streamed to the client devices 124-130.

According to one embodiment of the invention, the Greasemonkey scripts are served up for use remotely through a web service. There is one script present in the Greasemonkey extension that is triggered for an URL that is loaded. The Greasemonkey script then queries a web service passing in the current URL and the content type as parameters. The web service looks up a configuration file that in one embodiment of the present invention is encoded in JSON. The web server then serves the corresponding script back to the Greasemonkey script for it to execute. The configuration file has information of the URLs against which a particular script is to be triggered. The configuration file also has information of a list of excluded URLs and content types for which scripts are not to be triggered. All the URLs are filtered through regular expressions.

According to one embodiment of the invention, when the application environment 222 is the Firefox browser, a customized Redirector extension is also used. When the Firefox browser is launched and the customized extension is initialized, the Redirector extension creates a socket to hardcoded port on the control server 220. The customized extension performs actions such as page scrolling, page refreshing, stopping page loads, blocking URLs, and the like.

According to one embodiment, the customized extension is used to perform page commands forwarded from the client device 124. For example, when the player 236 on the client device 124, in response to a user action sends commands such as scroll page, refresh page, stop page, load URL, and the like, to the control server 220 on the delivery server 112, the control server 220 relays these commands to the customized extension. The customized extension in turn parses the commands and performs the appropriate action as a script on the Firefox browser. According to one embodiment, the customized extension can also be used to block URLs. The Firefox browser asks the customized extension if it should load a URL, and depending on the category of the URL, the request is served or cancelled. The list of blocked URLs comes from the configuration file of the content that has been currently loaded. The URL request is filtered through regular expressions. There are five categories of URLs:

1. White listed URLs: when such a URL is requested, the extension serves the }} request.
2. Black listed URLs: when such a URL is requested, the extension cancels the request.
3. Pop UP listed URLs: when such a URL is requested to load, the extension cancels the request and signals the client device 124, via the control server 220 and the player 236 on the client device, to show a message to the user informing them that the pop up was blocked.
4. Browser listed URLs: when such a URL is requested to load, the extension cancels the request and signals the client device 124, via the control server 220 and the player 236 on the client device, to show a message to the user to load the URL natively.
5. Ad URLs: when a URL does not match any of the above URLs, the extension cancels the request and signals the client device 124, via the control server 220 and the player 236 on the client device, to show the URL loaded in a web view inside of the player.

The customized extension for the Firefox browser application environment can also signal the client appropriately with a message to purchase an application after a trial period is over. When the customized extension is initialized, it queries a service for the payment information of the user for the content loaded. If the content is paid for, the user is given an uninterrupted browsing session. If the user has not yet paid for the content, he/she is considered a trial user. When the trial is over, the extension signals the client device 124, via the control server 220 and the player 236 on the mobile device, to display a message that the trial period is over and provide an option to buy the content. Any further requests are cancelled until the user purchases the content. Using a similar mechanism during the trial period, the user is presented, at periodic intervals, with messages in pop-up windows to make a purchase. In one embodiment of the invention, this payment setup is used for subscription payment systems.

In yet another example, if the native environment for the application that is hosted is Android, the application environment 222 module is a virtualization/emulation software and Android OS. The virtualization/emulation software provides an environment for the Android OS to run. To instrument the application, a custom launcher is used to control the launching of applications. A launcher is a main view of the OS and is responsible for starting other applications. The default launcher of Android is a home screen that a user usually sees. The custom launcher enables launching into the application directly when a client connects, and also prevents the application from exiting when user presses the back button. To achieve a seamless user experience, the data specific to mobile devices 124 are also captured in the mobile device and sent through the control channel to the control server 220. This data may include the device orientation, GPS location, gyro/accelerometer data, and the like.

According to one embodiment of the invention, the control server 220 is a module that authenticates a client based on input username and password. The control server 220 is also configured to receive input commands from the user via the player 236 on the mobile device 124 and forward these commands to the application environment 222 for the current application. The control server 220 is further configured to forward commands and messages from the application environment 222 to the player 236 on the client device 124 to control the look of the screen on the client device, such as for example, to display notifications that an application has launched, that a pop-up should be displayed, and the like.

In one embodiment of the present invention, authentication is done using PAM authentication. According to one embodiment, the provisioner 218 creates the usernames and passwords for each user. Once the control server 220 has authenticated the user, it knows what username to use for subsequent operations.

According to embodiment of the invention, once the control server 220 has authenticated the mobile client, it executes two processes. The first process is executed by the virtual screen 224 module. According to one embodiment, the virtual screen 224 module is an Xvnc session which provides a X11 display for the application the user wants to run. Xvnc is the Unix VNC (Virtual Network Computing) server, which is based on a standard X server. According to this embodiment, applications can display themselves on Xvnc as if it were a normal X display, but the applications are configured to actually appear on any connected VNC viewers rather than on a physical screen.

The control server 220 may also execute a bash script that sets any preferences needed for the application selected, such as Firefox preferences. The script starts the audio and video streamers, the window manager, and the application the user requested.

The second process or environment the control server 220 starts is the application environment 222 for the selected application. According to one embodiment of the invention, the control server 220 maintains a description of which specific application environments are used based on the type of application selected and the environment of the delivery server 112.

According to one embodiment of the invention, the video capture and streamer 226 module is a module that captures video frames output by the virtual screen 224 module. After the frames are captured, the video capture and streamer 226 module subsequently encodes and streams the video to the mobile device 124.

In one embodiment of the present invention, the video capture and streamer 226 encodes in near real-time without a large buffer of frames and streams the encoded frames to the mobile device 124, where the video decoder 230 on the mobile device 124 decodes in near real-time, also without a large buffer of frames, thus achieving a highly responsive video display.

In one embodiment of the present invention, at start-up, the video streamer and capture 226 module connects to the control server 220. The control server 220 sends the video capture and streamer 226 module the parameters it should use, including frame rate, bit rate, and a video port to stream the video to the mobile device 124. The connection between the control server 220 and the video capture and streamer 226 is maintained throughout the lifetime of the connection from the client device 124, and can be used for quality of service adjustments of the video stream.

According to one embodiment, video capturing and encoding parameters are selected in a way that the system fully utilizes the network bandwidth designated to the video stream to produce high-quality video while keeping the encoding complexity sufficiently low to minimize the encoding time required for each frame, as part of the low-latency design. To further achieve minimal latency in the system so that applications are highly responsive to user input, the server encodes each video frame right after being captured, and the output from the encoder is immediately fed into the socket without excessive buffering or delay. On the client, the video decoder continuously parses the incoming video data from the socket. As soon as it collects all the data required to decode a video frame, the frame is decoded, resized if needed, converted to an appropriate color space, and displayed. Again, video data are decoded and displayed as soon as they are available and there is no excessive buffering to ensure minimal latency.

According to one embodiment of the invention, the video capture and streamer 226 module consists of a set of scripts (e.g. Phython scripts) for capturing, encoding, and streaming video to the mobile device 124. According to one embodiment, the script launches one or more video processing programs (e.g. programs implemeted using video processing libraries provided in FFMPEG) for the capturing, encoding, and streaming.

According to one embodiment, the video capture and streamer 226 module captures the display output by the virtual screen 224 module. For example, if using FFMPEG, the x11grab function is invoked to capture the display from the Xvnc display. The video capture and streamer 226 then encodes (e.g. using FFMPEG together with x264) the video according to preset parameters. According to one embodiment, the various parameters are configured to provide low-latency operations to achieve real-time responsiveness to inputs provided by a user. The video capture and streamer 226 module captures the encoded output and streams the video to the mobile device 124. The video stream connection to the mobile device 124 is maintained for the lifetime of the mobile device 124 client connection. The mobile device 124 decodes the video using the video decoder 124 module, which in one embodiment of the invention, uses the H.264 decoder from the avcodec library in FFMPEG. The resulting frames are displayed by the player 236 module on the client device 124. The screen display may be done using a low-level API such as, for example, OpenGL ES (e.g. on iOS-based mobile devices), Surfaces (e.g. for Android-based mobile devices), and the like.

In one embodiment of the present invention, the video is encoded by the video capture and streamer 226 module on the delivery server 112 into a byte stream (e.g. an H.264 Annex B byte-stream using FFMPEG and x264), and streamed to the client device 124 through a TCP socket. The video capturing and encoding is based on a video frame rate (in frames/sec or fps) and maximum video bit rate (in bits/sec or bps). The two parameters together determine a maximum frame size which identifies a maximum number of bits that the encoder can spend to encode a frame. The resulting visual quality of the frame is affected based on the maximum frame size that is selected.

On the client device, the video decoder 230 module parses the byte-stream into data units each corresponding to an encoded video frame and feeds them sequentially a decoder (e.g. H.264 decoder). However, because of how H.264 Annex B byte-streams are defined, the video decoder 230 module is able to recognize the completion of an encoded frame once the start of the next frame is observed. Therefore, a video frame cannot be correctly parsed and decoded until the next frame is received, resulting in an extra latency of the duration of one frame in the display of video content, significant for an interactive system. According to one embodiment, in order to address this latency, the video capture and streamer 226 module is configured to prefix a 4-byte field for each encoded video frame in the byte-stream, indicating the number of bytes included in the encoded frame. With this prefix, the video decoder 230 on the client device 124 can extract an encoded frame from the byte-stream as soon as it arrives and pass it to the decoder without having to wait for the next frame.

According to another embodiment, the video capture and streamer 226 module is configured to append a tag for marking the end of a video frame. For example, an AUD (Access unit Delimiter) defined in H.264 may be appended to the end of each encoded frame. Although AUD in H.264 is designed for marking the beginning of a video frame, it is inserted into the stream right after an encoded frame instead, without having to wait for the next frame to be captured or encoded. The decoder on the client detects the AUD immediately after receiving an encoded frame and starts decoding the frame without having to wait for the next frame.

In one embodiment of the present invention, the video capture, encoding, and/or streaming parameters can be adjusted in real-time to allow for quality, latency, and/or bandwidth trade-offs, depending on the particular application or game. For example, in one embodiment of the invention, the lowest latency settings are used for Flash-based applications to provide better responsiveness at the expense of video quality. However, for certain Window's games, higher latency settings are used to avoid screen pixilation. These parameters are initially set in the configuration file for a particular application or game, and are configured to be modified in real-time. For example, parameters such as the video frame rate and/or maximum video bit rate may be adjusted in real-time while streaming a particular application or game, based on a monitored condition of the network.

More specifically, embodiments of the present invention provide two solutions to stream video from the delivery servers 112 to the client devices 124 with low latency so that applications provide real-time response to user input, while maintaining good visual quality: a first solution based on TCP (Transmission Control Protocol); and a second solution based on UDP (User Datagram Protocol). In both solutions, the virtual screen display on the server is periodically captured into video frames based on the frame rate specified in the system. The video frames are encoded and delivered from the video capture and streamer 226 on the server to the video decoder 230 on the client, via either a TCP or an UDP socket. Video capturing and encoding parameters are selected in a way that the system fully utilizes the network bandwidth designated to the video stream to produce high-quality video while keeping the encoding complexity sufficiently low to minimize the encoding time required for each frame, as part of the low-latency design. To further achieve minimal latency in the system, on the server each video frame is encoded right after being captured, and the output from the encoder is immediately fed into the socket without excessive buffering or delay. On the client, the video decoder continuously parses the incoming video data from the socket. As soon as it collects all the data required to decode a video frame, the frame is decoded, resized if needed and converted to an appropriate color space, and displayed. Again, video data are decoded and displayed as soon as they are available and there is no excessive buffering to ensure minimal latency.

TCP-Based Solution

According to one embodiment, the TCP-based solution uses a TCP socket to provide a reliable channel for video delivery. Potential transmission errors that may occur due to, for example, temporary glitches in the network or insufficient network bandwidth are all taken care of by the built-in error-detection and retransmission mechanism in TCP. Typical video streaming systems insert I-frames periodically in the video stream to enable random access and error recovery capability in the video decoder. However, for high-quality videos the I-frames are usually difficult to compress and therefore can take more time to transmit, resulting in a surge in latency. In the TCP-based solution, since error recovery is no longer needed at the decoder level and random access capability is not required in the interactive streaming application, except for the first frame in the video stream, I-frames are not used to avoid such a latency surge.

When transmission errors occur in the network, the TCP socket on the serer side automatically slows down outgoing transmission, and the video traffic coming into the socket from the video streamer can be congested and buffered in the socket, increasing the video latency experienced on the client. To relieve such congestion, the amount of video traffic sent into the socket is quickly decreased so that the latency can be reduced back to a minimal level. In this regard, a QoS (Quality of Service) adaptation algorithm dynamically adjusts the video capturing and encoding parameters based on the network condition. According to one embodiment, the QoS adaptation algorithm not only downgrades video QoS, hence decreasing the amount of video traffic during bad network conditions to reduce latency, but also upgrades video QoS when additional network bandwidth is available to further improve the video quality. The QoS adaptation algorithm determines two QoS parameters used in video capturing and encoding: video: (I) frame rate (in frames/sec or fps); and (2) maximum video bitrate (in bits/sec or bps), denoted by fr and mbr respectively. The two parameters, fr and mbr, together determine the maximum frame size (mbr/fr), the max. number of bits that the video encoder can spend to encode a frame, which helps provide a good indication of the resulting visual quality of the frame. The operational range of the QoS parameters is defined by four system constants MIN_FR, MAX_FR, MIN_MBR and MAX_MBR such that MIN_FR<=fr<=MAX_FR and MIN_MBR<=mbr<=MAX_MBR. Another constant MBR_STEP (in bits/sec or bps) is specified in the algorithm to map the QoS parameters into a discrete set of QoS levels, together with two time intervals DOWNGRADE_INTERVAL and UPGRADE_INTERVAL that define how much time the algorithm has to wait before making a QoS adjustment. Table 1 is a pseudo code of the QoS algorithm for the TCP-based solution.

TABLE 1

```
define MAX_LEVEL as floor(MAX_MBR|MBR_STEP)
define MIN_LEVEL as ceil(MIN_MBR|MBR_STEP)
last_downgrade_time = 0
last_upgrade_time = 0
last_congestion_time = 0
for each level that MIN_LEVEL <= level <= MAX_LEVEL
    congestion_counter[level] = 0
end
```

TABLE 1-continued

```
current_level = min(max(MAX_FR, MIN_LEVEL), MAX_LEVEL)
for each video frame
    previous_level = current_level
    current_time = current system time
    if (socket is congested in the previous transmission)
        last_congestion_time = current_time
        congestion_counter[current_level] =
            congestion_counter[current_level] + 1
        if (current_level > MIN_LEVEL)
            if (current_time - last_downgrade_time >
                DOWNGRADE_INTERVAL)
                if (current_level > MIN_FR)
                    current_level = max(MIN_FR, MIN_LEVEL)
                else
                    current_level = MIN_LEVEL
                end
            end
        end
    else
        if (current_level < MAX_LEVEL)
            multiplier = pow(2, congestion_counter[current_level + 1])
            if (current_time - max(last_upgrade_time,
                last_congestion_time) >
                multiplier * UPGRADE_INTERVAL)
                current_level = current_level + 1
            end
        end
    end
    if (current_level < previous_level)
        last_downgrade_time = current_time
    else if (current_level > previous_level)
        last_upgrade_time = current_time
        for each level that MIN_LEVEL <= level <= previous_level
            congestion_counter[level] = 0
        end
    end
    mbr = current_level * MBR_STEP
    fr = min(max(current_level, MIN_FR), MAX_FR)
end
```

According to one embodiment, a congestion in the TCP socket is detected by testing if new data can be written into the socket within a certain timeout time (e.g., 20 msec), using, for example, a linux poll command. Upon congestion in the socket, the video capture and streamer 226 drops the video frame rate to a minimum value and correspondingly reduces the maximum video bit rate. In addition, when congestion occurs at a certain QoS level, the congestion count for that level is increased to record the congestion. If no congestion has occurred for a preset time since the last congestion or last QoS upgrade, indicating a good network condition, the algorithm gradually upgrades the QoS parameters. This interval increases, exponentially for example, with the congestion count at the destination QoS level, making it more difficult to upgrade to a level already shown to be congestion-prone. If the algorithm stays at a certain QoS level without a congestion long enough that it upgrades to the next level, the original level proves to be well supported by the network and the congestion counts of the level and all levels below it are reset to zero. According to one embodiment, when the value of the QoS level becomes smaller than MIN_FR, the video framerate fr stays at MIN_FR but the visual quality of each frame further degrades as indicated by the decrease in the max. frame size mbr/fr. Similarly, when the QoS level becomes larger than MAX_FR, fr stays at MAX_FR but quality of each frame is further improved.

In general, a video encoder does not always produce video traffic at the specified maximum bit rate. The video traffic generated can be far below mbr when the video content is rather static, and only approaches mbr during fast-moving scenes. This leads to an issue that congestion may never occur in a static scene, and the QoS adaptation algorithm keeps upgrading the QoS level multiple times although the upgraded mbr is already well above the bandwidth supported by the network. Significant congestion, hence high latency, can then be set off by a sudden scene change in the video content that generates traffic approaching the highly overvalued mbr. According to one embodiment, to resolve this issue, during a certain time interval right after a QoS upgrade, the video encoder is modified to append dummy data that is ignored in the decoder at the end of each encoded frame so that the frame size reaches the maximum frame size mbr/fr. This modification helps ensure that the video traffic temporarily reaches the specified mbr right after each QoS upgrade. If this bitrate is already more than the network can support, a minor congestion with less impact on latency is triggered followed by a timely QoS downgrade.

UDP-Based Solution

According to one embodiment, a retransmission mechanism in the TCP-based solution helps guarantee that all the data fed into the socket by the video streamer eventually arrive at the video decoder. However, during a bad network condition, the additional time required for retransmission and the potential congestion in the socket can have an adverse impact on the video latency. Although the QoS adaptation algorithm is configured to quickly relieve the congestion, the transient latency increase usually manifests in the form of a momentary pause in the video, which is undesirable in some applications. The UDP-based solution tackles the problem differently. The UDP-based solution does not attempt any retransmission. Data is not buffered in the socket and does not get discarded if not delivered in time. Therefore, video latency is less influenced by the network condition and stays rather constant, at the expense of potential transmission errors at the decoder level. In terms of user experience, the UDP-based solution differs from the TCP-based solution in that instead of potentially introducing momentary video pauses, occasional decoding errors may become noticeable.

The UDP-based solution uses RTP (Real-time Transport Protocol) to deliver the video stream from the server to the client over a UDP socket. RTP handles reordering of the UDP packets and detects if any packet gets lost in the transmission. Without retransmission, a lost packet can lead to decoding errors visible in the decoded frame that cannot be fully removed by error concealment techniques in the decoder. These visible decoding errors can also propagate across multiple frames because of the inter-frame dependency in the video stream. To stop such propagation, whenever a lost packet is detected a request for an intra-refresh cycle is sent from the client to the server through the control channel. Instead of using I-frames that can create a surge in latency, intra refresh is a technique in video coding that evenly distributes intra blocks that can be decoded independently from previous frames over multiple frames to stop error propagation while minimizing the increase in video traffic.

In a typical network setup, UDP packets get lost occasionally even when the available network bandwidth is sufficient for the video traffic. However, when packet losses occur frequently, an assumption is made that the current network bandwidth can no longer support the video traffic, and the video QoS level is downgraded. In this regard, a QoS adaptation algorithm similar to the one for the TCP-based solution is used for UDP with two main differences. First, the algorithm for UDP runs on the client instead of on the server. The QoS level determined on the client is then signaled to the server through the control channel to adjust the parameters in video capturing and encoding. Second, the algorithm detects if the frequency of UDP packet losses exceeds a threshold, rather than testing for congestion in the TCP socket, to decide if a QoS downgrade is needed or if an upgrade can be performed.

According to one embodiment of the invention, the audio capture and streamer 228 module is a module that captures audio produced by the application. After the audio is captured the audio capture and streamer 228 module subsequently encodes and streams audio to the client device 124.

In one embodiment of the present invention, audio is captured by the audio capture and streamer 228 module using pulseaudio. Each application has a pulse sink created for it by the provisioner 218. When the application is launched, the pulse sink for the application is set to the one created by the provisioner 218. This ensures that all audio from the application goes to the pulse sink for the user requesting the application. For non pulse-aware applications, a wrapper script, such as padsp, is used to provide an OSS to pulseaudio bridge.

In one embodiment of the present invention, to capture the audio, parec is used with the source set to be the sink's monitor. The output from parec is passed into an audio encoder.

In one embodiment of the present invention, the audio encoder can be either CELT, MP3 or the audio can be sent uncompressed. The setting used is determined by what the client supports.

In one embodiment of the present invention, the output from the audio encoder is passed to the UDP audio streamer. Upon receiving the audio stream, the client device 124, using the audio decoder 232 module decodes the audio. In one embodiment of the invention the audio decoder 232 uses the CELT library. In another embodiment of the invention, the audio decoder 232 uses the native iPhone MP3 decoding. The audio decoder 232 in the client device 124 uses a ring buffer to ensure too much audio data doesn't buffer up and create latency. It also uses Audio Queue Service for low latency operation.

In one embodiment of the present invention, the audio capture and streamer 228, uses Python scripts to monitor all audio processes on the delivery server 112. If any process dies, all the audio processes are restarted and the user only experiences a brief and sometimes unnoticeable audio interruption.

According to one embodiment of the invention, the player 236 is a module that plays on the client device 124, the application that was selected by the user and which is executed on the delivery servers 112. According to one embodiment, the player allows a user of the client device to play content provided by a software application that is not originally intended to run in the application environment provided by the client device. For example, the client device does not provide the necessary APIs provided by the native application environment of the software application. The client device can thus be described as providing a non-native application environment with respect to the software application. In this regard, the software application is run on the delivery server 112, and the player 236 displays video and plays audio output of the application that is streamed from the delivery server to the client device 124. The player 236 also accepts input from the user, maps the input to a predefined command, encodes the command using a binary protocol, and sends the encoded command over the control channel to the delivery server 112. The mapping of the user input to predefined commands is based on a configuration file and/or modified based on the content currently displayed.

The player 236 communicates with the server side modules using a control channel. According to one embodiment, all communication between the client and server, which the exception of streamed video and audio, occurs over the control channel. Separate video and audio ports on the server are used to stream the video and audio.

According to one embodiment of the invention, the video decoder 230 decodes video streamed from the server. In one embodiment of the invention, the video decoder 230 uses the H.264 decoder from the avcodec library in FFMPEG.

According to one embodiment of the invention, the video decoder 230 decodes the incoming video stream into video frames in a YUV420 format. To playback the video frames with a desired color representation and dimension, the video decoder converts the video frames back to a RGB color space and resizes the video frames before being displayed on the screen. According to one embodiment, the color-space conversion and resizing is performed using programming shaders running on a graphics processing unit (GPU) through graphics APIs (e.g., OpenGL) that are generally available on clients such as iOS or Android devices. Color-space conversion and resizing using GPUs rather than CPUs significantly reduces the processing time due generally to the parallel processing architecture of GPUs especially suitable for such tasks, resulting in a reduced latency in the system as well as a higher frame rate that can be supported on the client.

According to one embodiment of the invention, the player 236 is independent of and not specific to any particular application content that it will present on the client device 124. Only one version of the player 236 is needed for a particular client device 124, regardless of how many different applications or application types it presents on the client device.

According to one embodiment of the invention, all communications between the player 236 on the client device 124 and the control server 220 on the delivery server 112 happens over the control channel. The player 236 takes input in the form of touches or on-screen keyboard selections. The input may also be provided via other input devices such as, for example, physical keypads, joysticks, and the like. The input is mapped to preset command and sent from the player 236 over the control channel to the control server 220. The control server 220 converts the received command into a command applicable for the application (e.g. mouse-down command, mouse-up command, or keyboard command) using a simulation tool such as, for example, libxdotool. Thus, the control server is configured to translate an input provided using a particular input device, to a second input that is generally provided using a different input device.

According to one embodiment of the invention, the player 236 may also send commands in response to user gestures. For example, a swipe down gesture is mapped to a scroll down command for a browser session. The mapping of the gesture to a particular command is based on the configuration file provided to the player for the particular application or game that is being played. The scroll down command is sent by the player 236 as a scroll down command over the control channel to the control server 220. The control server 220 forwards the scroll down command over a socket connection to the application environment 222. The application environment may run specific scripts to execute the particular command. For example, for Flash applications, a Greasemonkey script in the application environment 222 executes an input command using Javascript.

According to one embodiment of the invention, the player 236 and the control server 220, using custom commands communicated over the control channel, can coordinate the velocity of the user's scrolling on the client device 124 and the resulting scrolling of the video screen. For example, in one embodiment of the invention, the player 236 interprets the velocity of the user's finger movement into a scroll command of x pixels. The player 236 sends a custom command for a scroll of x pixels via the control channel to the control server 220, which in turn provides the command to the application environment 222. The application scrolls its screen by x pixels and outputs the updated screen for capture and streaming to the client device 124. The video decoder 230 decodes the updated video frames and the player 236 displays a screen where its contents have moved x pixels in response to the user's scrolling gesture. The rapid fine-grain scrolling on the client device and other user input which are communicated to the server causes the returned video and audio streams to reflect the user's scrolling and other action as if playing the application on its native device. This coordination of user input gestures on the client device 124, with reaction of the application on the delivery server 112, provides a highly interactive and responsive experience for the user.

According to one embodiment, the control channel on the client exposes many different types of actions which map to the different types of content. These are encoded using a binary protocol and sent to the server. The server executes these actions differently based on the type of content currently active. Below are a few examples:

1) Control channel exposes: sendMouseDown(button, x-position, y-position)

Encoding: 2 byte integer indicating the message size (5 bytes), 1 byte indicating the button, 2 bytes for x position, 2 bytes for position Executed: via a library that talks to the X11 protocol called xdotool 2) Control channel exposes: sendOrientationChanged(orientation)

Encoding: 2 byte integer indicating the message size (1 byte), 1 byte indicating the 4 possible orientation Executed: via a TCP socket connected to the simulator that tells it to change orientation 3) Control channel exposes: sendTouches(action, active_touch_id, number_touches, touch_id1, x-position1, y-position1, . . . )

Encoding: 2 byte integer indicating the message size (3+5*number_touches bytes), 1 byte indicating the type of action (touch down/move/up), 1 byte indicating the active touch ID that triggered this event, 1 byte the number of touches, followed by the information of each individual touch [touch_id (1 byte), x-position (2 byte), y-position (2 byte)].

Executed: via a TCP socket connected to the simulator that tells it the current touch event and all the touch data On the client, each of these commands can be executed by different types of input. For example, sendMouseDown can be called when the "tap" gesture is recognized if the current server-side content is flash. However, if the current server-side content is an Android game, the sendTouches command can be executed in response to the "tap" gesture as this makes more sense.

According to one embodiment of the invention, instead of mapping a user input to a specific command catered for the application at the client side, the raw input data is provided to the client and the server converts the raw input data to an input that is appropriate based on the application environment and/or context of the application. For example, if the server-side application environment is Firefox and the content inside is a web page, a touch down immediately followed by a series of touch moves and touch up (a swipe/drag action) on the client mobile device implies the user wants to scroll the page. However, if the control server is not aware that the content is a web page, the server sends a mouse down followed by mouse moves and a mouse up, which is a selection action in Firefox. In order to interpret a swipe/drag action (touch down→move→up) as a scroll command on the server side, embodiments of the present invention use a Firefox extension to capture all the mouse events and interpret them as certain gestures appropriately.

According to one embodiment of the invention, the audio decoder 232 module decodes the audio streamed from the server. In one embodiment of the invention the audio decoder 232 will use the native audio decoder of the mobile platform. In another embodiment of the invention the audio decoder 232 will use the CELT decoder library. The CELT codec is a low latency compression-decompression algorithm for audio.

In one embodiment of the present invention, the player 236 and the other modules the player 236 uses on the client device 124, including the video decoder 230 and audio decoder 232, are packaged as a native application for a particular client device. For example, there is a player application written specifically for iOS devices, such as iPhone 126 or iPad 128 mobile devices, and another player application written specifically for Android 130 mobile devices.

Figure 3A:
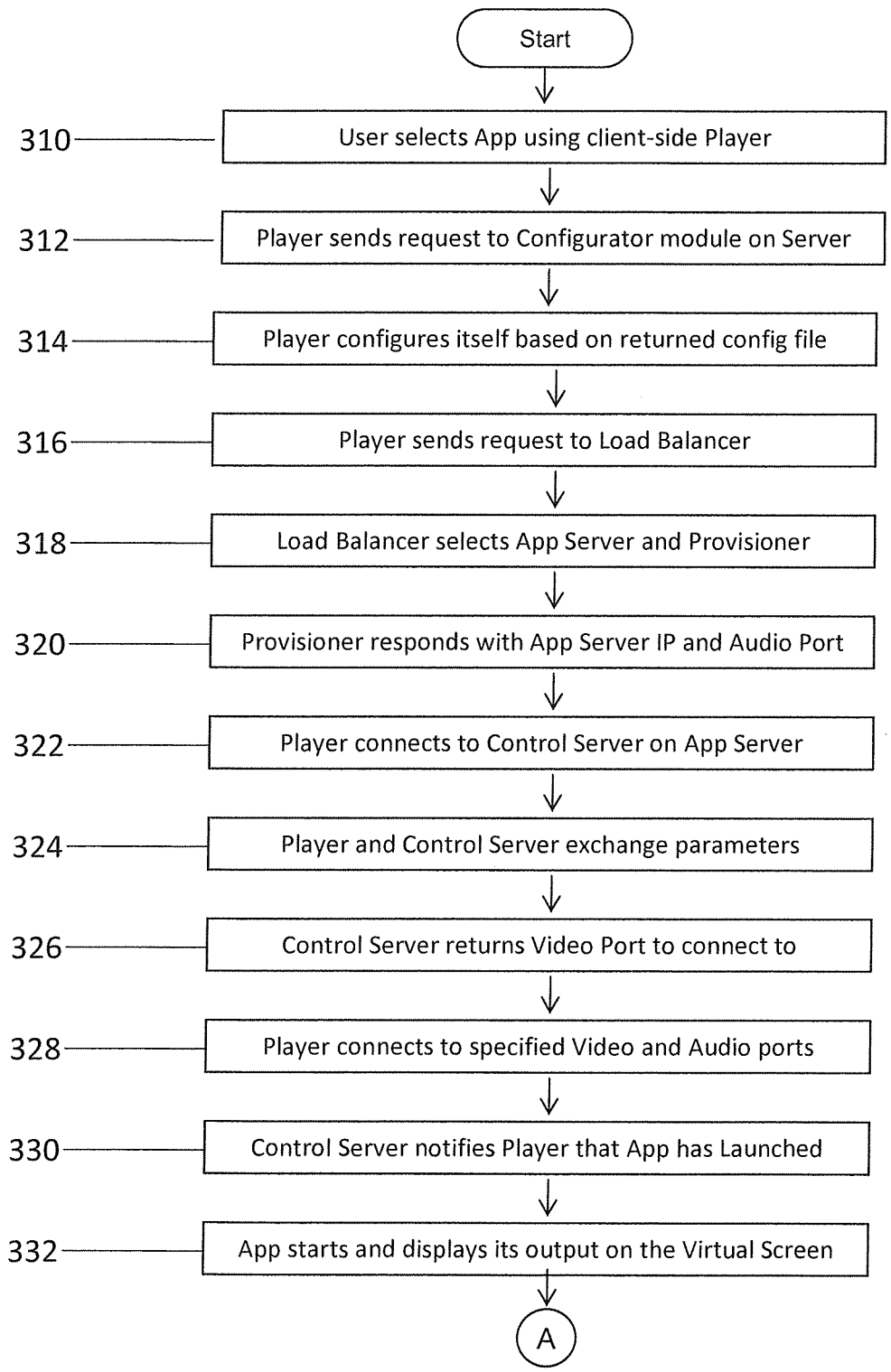
FIGS. 3A-3B are flow diagrams of a process for providing interactive content generated by an application configured to run in one application environment, to a client device providing a different application environment, according to one embodiment of the invention.
Figure 3B:
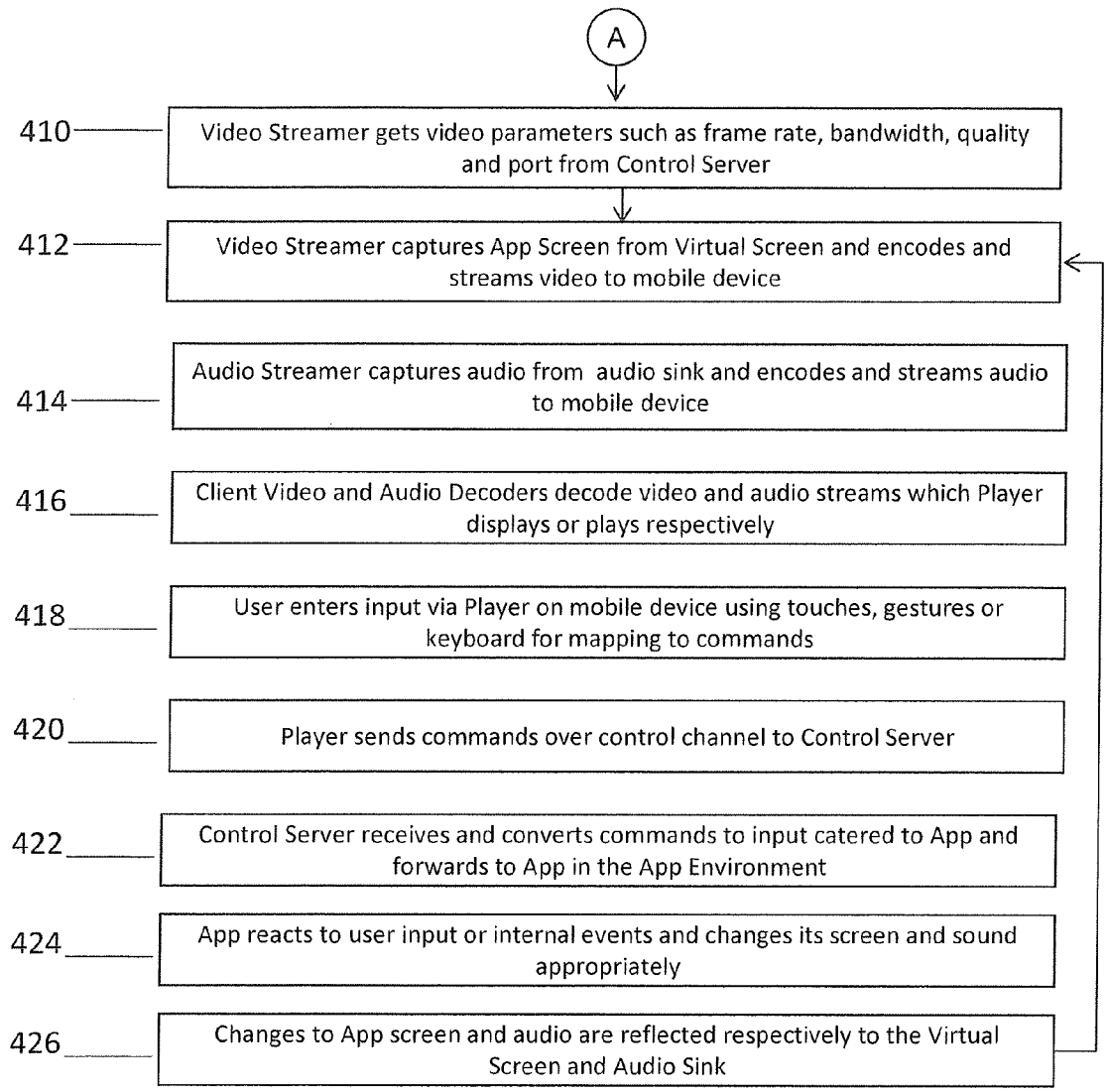

FIGS. 3A-3B are flow diagrams of a process for providing interactive content generated by an application configured to run in one application environment, to a client device providing a different application environment, according to one embodiment of the invention.

The process starts, and the monitoring server 114 receives from the client device 124 identification of the particular software application to be invoked. In this regard, the monitoring server 114 receives a user selection of the particular application in step 310.

In step 312, the player 236 on the client device 124 sends a request for the selected application to the configurator 214 on the monitoring server 114.

In step 314 the configurator 214 returns the appropriate configuration file for the selected application back to the player 236, and the player 236 configures itself based on the parameters of the returned configuration file. For example, the player sets its display resolution, maximum bit rate, maximum frame rate, audio and video codec used, and the like.

In step 316, the player 236 sends a request to the load balancer 216 on the monitoring server 114 to start an instance of the selected application.

In step 318, the load balancer identifies and selects a specific delivery server 112 and an instance of the provisioner 218 on the same delivery server. According to one embodiment, the load balancer may select a delivery server which is geographically close to the client device.

In step 320 the provisioner 218 responds to the load balancer 216, who responds to the player 236, with parameters that include credentials for accessing the created instance of the delivery server 112, an IP address of the delivery server, and an audio port on the delivery server, to which the player should connect.

In step 322, the player 236 uses the parameters returned in step 320 to connect on the control channel to the instance of the control server 220 selected for the instance of the application.

In step 324 the control server 220 and the player 236 exchange over the control channel, parameters (e.g. username and password) for the instance of the application, frame rate, bit rate, supported video and audio codec, and the like.

In step 326 the control server 220 responds to the player 236 over the control channel with the video port on the delivery server 112 in which the player should connect.

In step 328 the player 236 connects to the video port specified by the control server 220 and the audio port specified by the provisioner 218.

In step 330 the control server 220 invokes the application in the application environment provided by the delivery server 112 and notifies the player 236 that the selected application has finished launching.

In step 332 the selected application generates screen display outputs and provides the outputs on the virtual screen 224 on the delivery server 112.

In step 410 the video capture and streamer 226 receives video parameters, such as, for example, frame rate, bandwidth, bit rate, and video port, from the control server 220.

In step 412 the video capture and streamer 226 captures and encodes a screen display output by the virtual screen 224 into various video frames according to the received frame rate. According to one embodiment, in order to achieve minimal latency in the system, each video frame is encoded after being captured, and the output from the encoder is fed to the video port without excessive buffering or delay. According to one embodiment, the maximum frame size of each video frame is based on the specified frame rate and the maximum bit rate.

In step 414 the audio capture and streamer captures audio from the audio sink of the selected application and then encodes and streams the audio to the client device 124 over the audio port.

In step 416 the video decoder 230 and audio decoder on the client device 124 respectively decodes the received video stream and audio stream, which the player 236 then displays or plays respectively on the client device. In this regard, the video decoder continuously parses the incoming video data from the socket. As soon as it collects all the data required to decode a video frame, the frame is decoded, resized if needed, converted to an appropriate color space, and displayed. Again, video data are decoded and displayed as soon as they are available and there is no excessive buffering to ensure minimal latency. According to one embodiment, the video decoder starts the decoding as soon as it identifies a tag (e.g. an AUD tag) which is inserted at the end of a particular video frame.

In step 418, the user enters input to the selected application via the player 236 using touches, gestures, keyboard entry, or any other form of input. According to one embodiment, the player 236 maps the user input (e.g. downward swipe, shaking of the device, changing orientation of the device, tapping on the screen, and the like) to a particular command defined in the configuration file for the application provided to the client device. For example, changing the orientation of the device may be mapped to a "sendOrientationChanged" command which receives, as a parameter, the orientation of the device. The change of orientation of the device and other inputs to the device are interpreted according to conventional mechanisms that will be understood by a person of skill in the art.

In step 420, the player 236 sends the mapped command(s) over the control channel to the control server 220.

In step 422 the control server converts the commands received from the player 236 to a corresponding input catered to the particular application (e.g. mouse or keyboard command understood by the application), and forwards the converted input commands to the application in the application environment 222.

In step 424, the selected application reacts to the user input or internal events, and changes its screen and sound output appropriately. In step 426 the changes to the screen are reflected onto the virtual screen 224 and the changes to the sound to the audio sink. The sequence then goes to step 412, and the streaming of video and audio to the client device continues.

In one embodiment of the invention, instead of mapping the user input to predefined high-level gestures or commands, such as sending a scroll down command when the user swipes down on the screen, the simplest mapping of the input or even the raw touch/input data from the client device is sent to the delivery server 112 over the control channel. For example, a mouse down event is sent when a user touches down on the screen. This mapping of input to the simplest command expected by the application environment on the server side avoids mapping to more complicated actions, such as high-level gestures or commands. The raw user inputs are then interpreted differently based on the content inside the application environment 222 and/or the context of the application. For example, a Firefox application provides a different context, which is browser based, than an Android application, which is touch-based. Thus, a mouse-down event may be transmitted to a Firefox application when a same action by a user would create the transmitting of a touch down event for an Adroid application. With respect to the transmitting of input based on content, instead of interpreting what the user wants to do (via, for example, gesture recognizers) on the client device, and sending it to the application on the server side, according to one embodiment of the invention, such gestures and/or user intentions are interpreted on the server side. For example, a touch down immediately followed by a series of touch moves and a touch up (i.e. a swipe/drag action) on the mobile device would imply that the user wants to scroll the page. If the control server makes a minimal interpretation based on the context of the application and transmits a mouse down input followed by mouse moves and mouse up inputs to, for example, a Firefox application, the application may interpret the input as a selection action instead of a scroll. Thus, for certain applications, the server is configured to capture all the mouse events and interpret them as a gesture prior to transmitting the input to the application. For a Firefox application environment, for example, whether interpreting a touch down event followed by a series of touch move events and a touch up event, as a scroll command, depends on the move direction. In the embodiment of the invention for Flash apps, such interpretation as a scroll command is disabled when the mouse down happens inside the Flash object, where the Flash object itself would interpret these mouse down/move/up events. Thus, for a Flash object, the inputs are not changed, and the minimally interpreted input (e.g. mouse down→move→up) is sent to the Flash object for interpreting the command on its own.

Interpreting the touch events on the delivery server 112 has the advantage of achieving content-aware gesture mapping. The application environment 222 knows exactly where the user touches and thus where the gesture starts and ends. Therefore the gesture can be better mapped creating a better user experience. In addition, sending the raw touch data improves responsiveness of the application because the raw input data is provided as the inputs are being entered instead of waiting for the entire input to complete. For example, there is no need for a swipe down event to complete before transmitting such an event to the application.

In one embodiment of the invention, the control channel is configured to transmit multiple touch inputs for application environments 222 that accept and expect such events (e.g. an Android application running in the delivery server 112). In this case, a touch tracker in the player 236 tracks the multiple touches. Each touch at the client side is assigned with a touch ID. According to one embodiment, each finger is represented with a touchID having associated coordinates (x, y). Each time the user starts or ends a touch event (e.g. putting one more finger down or lifting one finger up), the touch tracker in the player 236 groups all the touches along with the action (down/move/up) and the active touch ID that corresponds to the finger that initiated the event. This data is then sent through the control channel and to the control server 220. The control server 220 organizes the touch data into the format accepted by the application environment 222, and sends the formatted data to the application environment 222.

Figure 4:
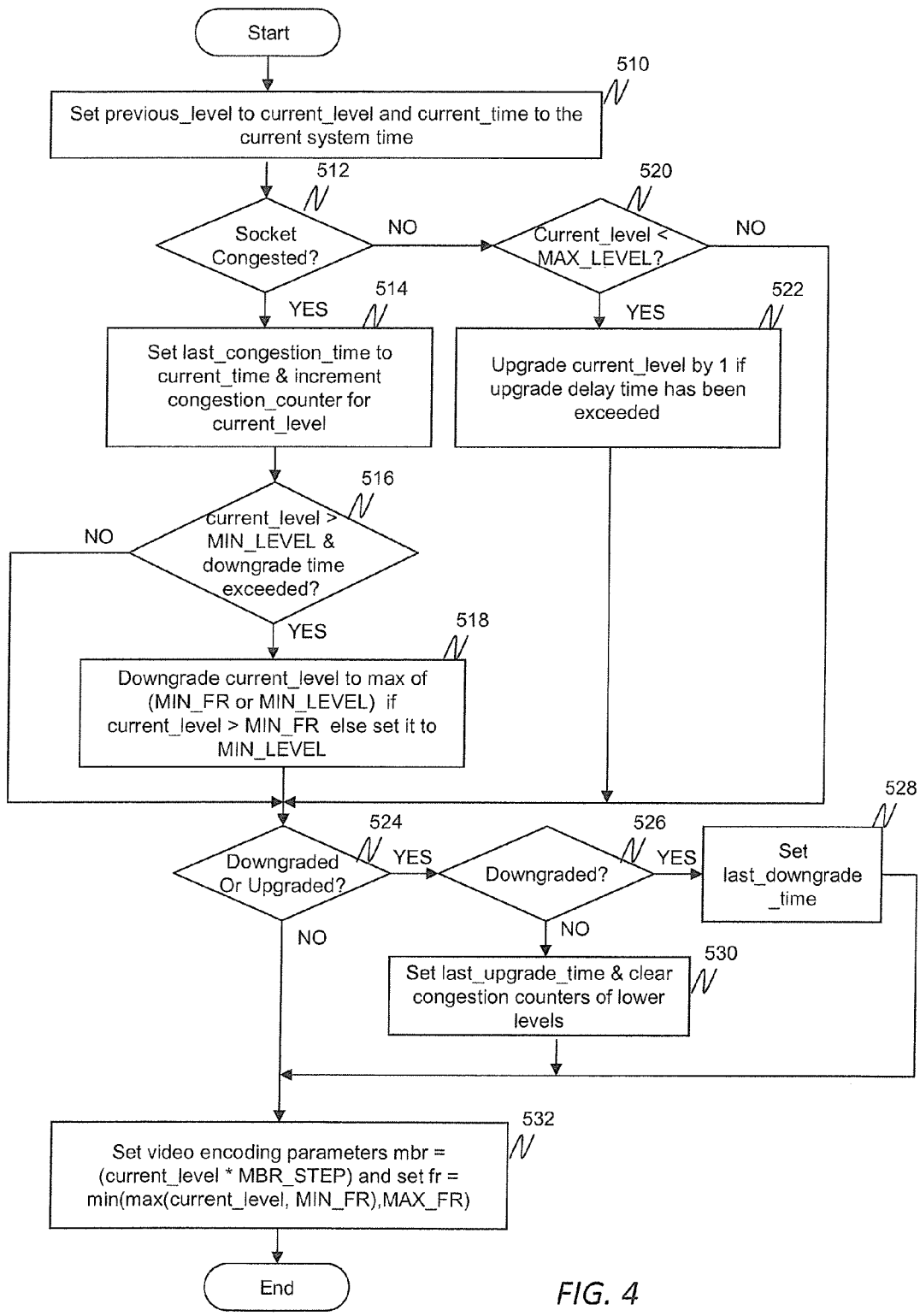
FIG. 4 is a flow diagram of a quality of service adaptation algorithm according to one embodiment of the invention.

FIG. 4 a flow diagram of process for dynamically adjusting the quality of streamed video frames during a streamed video session based on network congestion over a TCP socket, according to one embodiment of the invention. The process implements the QoS algorithm of table I. According to one embodiment, the process is implemented by the video capture and streamer module 226 on the mobile app delivery server 112.

In one embodiment of the invention, video quality is either dynamically downgraded or upgraded based on the concurrent congestion status of a TCP socket. In this regard, the process adjusts video quality by varying two aspects of video quality: video frame rate and video bit rate. For example, the video frame rate can range from 10 to 24 frames per second (fps), and the video bit rate can range from 320K to 2048K bits per second (bps). Video frame rate affects primarily the smoothness or choppiness of a video. For a given video frame rate, the video bit rate affects primarily the visual quality of individual frames.

In one embodiment of the invention, as congestion over a TCP socket occurs, both the video frame rate and video bit rate are downgraded together until the video bit rate hits a predefined floor value MIN_FR, after which the video frame rate is held constant but the video bit rate continues to be downgraded.

According to one embodiment, the process of FIG. 4 is invoked before the encoding of each and every frame of video to be transmitted to the client device. However at the initialization of the video streaming session, certain constant values are set that control the range and frequency of the adjustment of video quality. In one embodiment of the invention, the following constants are used:

MIN_LEVEL=minimum QoS level (e.g 5);
MAX_LEVEL=maximum QoS level (e.g. 32);
MIN_FR=minimum frame rate (e.g. 10);
MAX_FR=for maximum frame rate (e.g. 24);
MIN_MBR=for minimum bit rate (e.g. 320K);
MAX_MBR=maximum bit rate (e.g. 2048K);
MBR_STEP=bit rate increment (e.g. 64K);
DOWNGRADE_INTERVAL=downgrade interval time (e.g. 1000 milliseconds); and
UPGRADE_INTERVAL=upgrade interval time (e.g. 1000 milliseconds).

The outcome of the process is the setting of the video frame rate (fr) and the video bit rate (mbr) parameters which are subsequently be used by the video encoder to encode the next video frame.

The process in FIG. 4 starts, and in step 510, the video capture and streamer module 226 before the encoding of each frame first sets a previous quality level to the value of a current quality level, and further sets a current time to the current system time.

In step 512, the video capture and streamer module 226 determines whether the TCP socket was congested after the transmission of the last video frame. If the TCP socket was congested, the process goes to step 514 where the process attempts to downgrade the quality level by adjusting the value of the current quality level. In this regard, the process sets the value of a last congestion time to the value of the current time, and increments a congestion counter for the current quality level.

In step 516, the process determines whether the current quality level is greater than a preset minimum quality level. If the answer is NO, the process proceeds to step 524 because the process does not downgrade the level below the preset minimum quality level.

If the current quality level is greater than the preset minimum quality level, the process determines whether the difference between the current time and the last downgrade time exceeds a preset downgrade interval. If it does not, the processor proceeds to step 524. According to one embodiment, using a downgrade interval to control how frequently the level is downgraded insures a smoother downgrade process without wild down swings. If the downgrade interval time has been exceeded, the process proceeds to step 518.

In step 518, the video capture and streamer module 226 downgrades the current quality level to the preset minimum quality level if the current quality level is less than or equal to a preset minimum frame rate. If the current quality level is greater than the preset minimum frame rate, the process downgrades the current quality level to either the preset minimum frame rate or the preset minimum QoS level, whichever is a greater value. In either case, after the downgrade has been done, the process proceeds to step 524.

Referring again to step 512, if a determination is made that the TCP socket was not congested, the video capture and streamer module 226 proceeds to step 520 to check if an upgrade of the video quality level is possible. In this regard, the process determines if the current quality level is less than a preset maximum QoS level. If the answer is NO, meaning that the current quality level is already at the maximum level, the process proceeds to step 524.

If the current quality level is less than the preset maximum QoS level, the process proceeds to step 522 to attempt to upgrade the level by a preset amount, such as, for example, by one. In this regard, the process uses a congestion counter for the current quality level to compute a multiplier. According to one embodiment, if the congestion counter is zero, the multiplier is one; if the congestion counter is one, the multiplier is two; if the congestion counter is two, the multiplier is four, and so on. According to one embodiment, the multiplier acts as an exponential dampener. The multiplier is multiplied by a preset upgrade interval time to compute an upgrade delay time. The current time is then subtracted from the greater of either the last upgrade time or the last congestion time, and if the difference has exceeded the computed upgrade delay time, an upgrade take place. If an upgrade is allowed, the current quality level is incremented by one. In either case, the algorithm then proceeds to step 524.

In step 524, the video capture and streamer module 226 checks if either a downgrade or an upgrade of the current quality level has just occurred. If not, the process proceeds to step 532. If an upgrade or downgrade has just occurred, the process determines, in step 526, whether a downgrade has occurred. If the answer is YES, the process proceeds to step 528 where the last downgrade time is set to the current time and the process proceeds to step 532.

If instead in step 526 it is determined that an upgrade has just occurred, the process proceeds to step 530 for setting the congestion counters to zero for all quality levels less than or equal to the current level. That is, because of the upgrade, the process allowed to have confidence in the lack of congestion in all levels less than or equal to the current level to which it has been upgraded. The algorithm then proceeds to step 532.

Step 532 is the culmination of the process where the video frame rate and video bit rate are set based on the results of the algorithm. According to one embodiment, the video bit rate is set to the current quality level multiplied by a preset bit rate increment. In computing the video frame rate, the maximum value of either the current quality level or the preset minimum frame rate is selected. The result is then compared against the preset maximum frame rate. The minimum of the two values is then set as the video frame rate. The process ends, and the video encoder and streamer module 226 uses the set video frame rate and video bit rate to encode the next video frame to be streamed to the client device.

The processes of FIGS. 3-4 may be described in terms of a software routine executed by the corresponding CPU based on instructions stored in memory. A person of skill in the art should recognize, however, that the processes may be executed via hardware, firmware (e.g. via an ASIC), or in any combination of software, firmware, and/or hardware. Furthermore, the sequence of steps of the processes are not fixed, but can be altered into any desired sequence as recognized by a person of skill in the art.

A person of skill in the art should appreciate the embodiments of the present invention allow the efficient delivery of interactive applications built for one environment to various mobile devices (and other clients) for which they were not originally written. The various embodiments allow the applications to function on the new platforms with little or no redevelopment of the applications. Application developers will be able to quickly re-purpose their existing application assets to run on the new environments without the need to learn the technical details of the new platforms. The above embodiments also help eliminate the need to download the applications to the new platforms, or purchase separate applications for the new platforms.

According to the above embodiments, the applications are configured to appear to function on the new platform in the same way as they would on the native platform. The embodiments of the present invention also allow the applications to be highly responsive to the user's control. The high responsiveness is aided by reducing the latency of upstream inputs from the client to the server running the application, and latency of downstream audio and video from the server to the client.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. For example, although embodiments of the present invention contemplate providing content from applications configured to run on a particular application environment, to mobile platforms providing a different application environment, a person of skill in the art should recognize that the sender and recipient devices may run the same application environment. Also, the receiving platform need not be a mobile platform but any computing platform known in the art.

It is thus the applicant's intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

The invention claimed is:

1. In a system including a plurality of host devices, a client device, and a server coupled to the plurality of host devices and the client device over a data communications network, each host device hosting a software application configured to run on an application environment provided by the host device, and the client device receiving interactive content generated by a particular software application configured to run on an application environment different than an application environment provided by the client device, the server comprising:
a processor; and
a memory coupled to the processor and storing program instructions therein, the processor being configured to execute the program instructions, the program instructions comprising:
receiving from the client device identification of the particular software application;
identifying one of the plurality of host devices hosting the particular software application;
invoking the particular software application on the application environment provided by the identified host device;
periodically capturing and encoding a screen display output generated by the particular software application into a plurality of video frames;
streaming the plurality of video frames over the data communications network during a streaming session;
receiving interaction data from the client device in response to the streamed video frames;
converting the interaction data to a corresponding input catered to the particular software application;
providing the input to the particular software application, wherein the software application is configured to generate a second screen output in response;
identifying a configuration file associated with the particular software application,
wherein a user input is mapped to a particular command based on the configuration file; and
receiving the user input or the particular command from the client device as the interaction data.

2. The server of claim 1, wherein the client device is a mobile phone or electronic tablet.

3. The server of claim 2, wherein the software application is a Flash-based application, Windows application, Java-based application, or Linux application.

4. The server of claim 1, wherein the second screen is output in real-time with the providing of the interaction data by a user of the client device.

5. The server of claim 1, wherein the program instructions further include:
monitoring condition of the data communications network during the streaming session; and
dynamically adjusting a visual quality of one or more of the plurality of video frames during the streaming session.

6. The server of claim 5, wherein the program instructions for dynamically adjusting the visual quality includes dynamically adjusting a frame rate associated with the streaming session.

7. The server of claim 5, wherein the program instructions for dynamically adjusting the visual quality includes dynamically adjusting a video bit rate associated with the streaming session.

8. The server of claim 5, wherein the program instructions for dynamically adjusting the visual quality includes dynamically adjusting a maximum frame size of a video frame to be streamed during the streaming session.

9. The server of claim 5, wherein a maximum frame size is calculated based on a dynamically determined frame rate and video bit rate.

10. The server of claim 5, wherein the monitoring of the condition of the data communications network includes monitoring congestion of the network.

11. The server of claim 1, wherein the application environment provided by the host device provides an application programming interface not available to the application environment provided by the client device.

12. In a system including a plurality of host devices, a client device, and a server coupled to the plurality of host devices and the client device over a data communications network, each host device hosting a software application configured to run on an application environment provided by the host device, and the client device receiving interactive content generated by a particular software application configured to run on an application environment different than an application environment provided by the client device, a method for providing interactive content to the client device, the method comprising:
receiving from the client device identification of the particular software application;
identifying one of the plurality of host devices hosting the particular software application;
invoking the particular software application on the application environment provided by the identified host device;
periodically capturing and encoding a screen display output generated by the particular software application into a plurality of video frames;
streaming the plurality of video frames over the data communications network during a streaming session;
receiving interaction data from the client device in response to the streamed video frames;
converting the interaction data to a corresponding input catered to the particular software application;
providing the input to the particular software application, wherein the software application is configured to generate a second screen output in response;
identifying a configuration file associated with the particular software application,
wherein a user input is mapped to a particular command based on the configuration file; and
receiving the user input or the particular command from the client device as the interaction data.

13. The method of claim 12, wherein the client device is a mobile phone or electronic tablet.

14. The method of claim 13, wherein the software application is a Flash-based application, Windows application, Java-based application, or Linux application.

15. The method of claim 12, wherein the second screen is output in real-time with the providing of the interaction data by a user of the client device.

16. The method of claim 13 further comprising:
monitoring condition of the data communications network during the streaming session; and
dynamically adjusting a visual quality of one or more of the plurality of video frames during the streaming session.

17. The method of claim 16, wherein the dynamically adjusting the visual quality includes dynamically adjusting a frame rate associated with the streaming session.

18. The method of claim 16, wherein the dynamically adjusting the visual quality includes dynamically adjusting a video bit rate associated with the streaming session.

* * * * *

UNITED STATES PATENT AND TRADEMARK OFFICE
CERTIFICATE OF CORRECTION

| | | |
|---|---|---|
| PATENT NO. | : 8,903,897 B2 | Page 1 of 1 |
| APPLICATION NO. | : 13/543720 | |
| DATED | : December 2, 2014 | |
| INVENTOR(S) | : Rohan Relan et al. | |

It is certified that error appears in the above-identified patent and that said Letters Patent is hereby corrected as shown below:

In the Claims

In column 26, line 55, in claim 16, delete "claim 13" and insert -- claim 12 --, therefor.

Signed and Sealed this
Thirty-first Day of March, 2015

Michelle K. Lee
*Director of the United States Patent and Trademark Office*